Aug. 20, 1963 — T. G. MIHRAN — 3,101,387
INSULATED SEAL FOR A ROD MOVABLE IN A WALL
Filed March 5, 1959
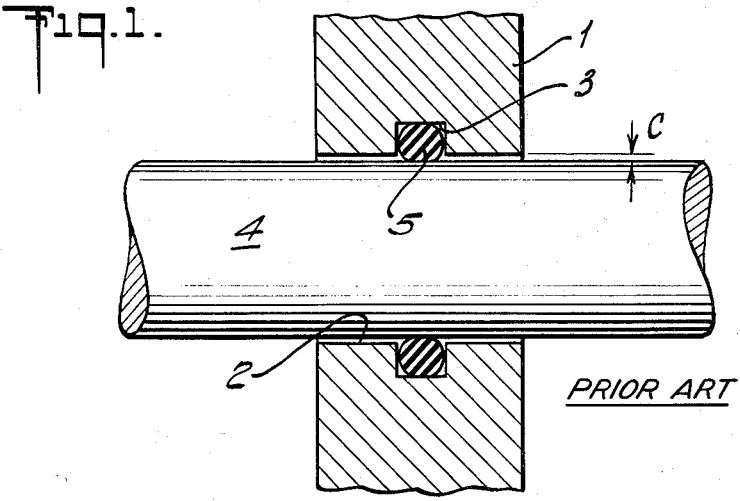
Fig.1. *PRIOR ART*
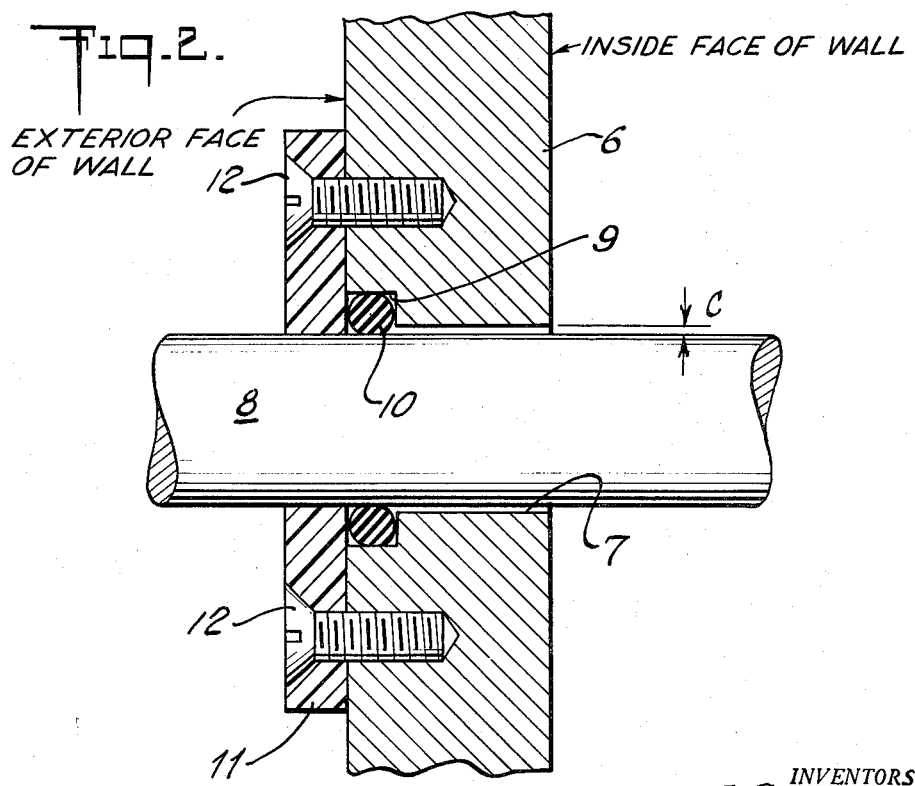
Fig.2.
INVENTORS:
T. G. MIHRAN
BY
Max H. Farmer
ATTORNEYS:

United States Patent Office 3,101,387
Patented Aug. 20, 1963

3,101,387
INSULATED SEAL FOR A ROD MOVABLE
IN A WALL
Theodore G. Mihran, Schenectady, N.Y., assignor, by mesne assignments, to the United States of America as represented by the Secretary of the Navy
Filed Mar. 5, 1959, Ser. No. 797,825
8 Claims. (Cl. 174—18)

This invention relates to insulated seals for rods that pass through and are movable in walls, on opposite sides of which walls fluid pressure differentials may exist. More particularly it is sometimes desirable to introduce a movable, cylindrical, metallic rod into a chamber of a vacuum system without making electrical contact with the metal wall defining the chamber and through which the rod passes. A tight fitting O-ring of elastic insulating material, such as neoprene, interposed between the rod and the passage of the chamber wall will sometimes serve that purpose, except that the O-ring may yield at times and enable direct contact of the rod with the passage wall.

An object of this invention is to provide an improved seal for a rod passing through and movable in a wall where fluid pressure differentials exist on opposite sides of the wall, which prevents electrical or direct contact between the rod and the wall through which the rod passes, which enables the clearance between the passage and the rod to be kept very small, consistent with design requirements for temperature variations, which is relatively mechanically simple, easy and inexpensive to make, which will operate with a minimum of attention for relatively long periods of time, which provides an adequate and effective seal, and which is particularly useful and effective to seal metal rods that pass through metal walls into a vacuum system.

Other objects and advantages will be apparent from the following description of one embodiment of the invention, and the novel features will be particularly pointed out hereinafter in connection with the appended claims.

In the accompanying drawings:

FIG. 1 is a sectional elevation through a wall where a rod passes through and is movable in a passage in the wall, and the passage is sealed with an O-ring in an ordinary channel or groove; and FIG. 2 is a similar sectional elevation through a metal wall where a metal cylindrical rod passes through and is movable in it, and the passage is sealed against fluid leakage through it along the rod in accordance with this invention.

In the construction illustrated in FIG. 1, which is not entirely satisfactory, the wall 1 of metal is part of the enclosing wall that defines a chamber in which an atmosphere above or below normal atmospheric pressure may exist, or where different fluid differentials may exist within and without the chamber. This wall is provided with a cylindrical passage 2 that extends therethrough from face to face and between its ends has an annular groove 3 in its peripheral wall that is spaced from both ends of the passage. A rod 4 passes loosely through said wall from face to face thereof in said passage. A tight fitting O-ring 5 of elastic insulating material is disposed in the groove 3 and tightly fits both the periphery of rod 4 and the bottom or peripheral wall of the groove 3, so as to provide a fluid resistant seal preventing fluid movement through the passage 2 along the rod 4. The manufacturers of O-rings recommend that the clearance "c" be held to an absolute minimum consistent with the design requirements for temperature variations, and if this clearance "c" is made a reasonable size such as 0.005", it has been found that in use the neoprene O-ring does not have sufficient strength to keep the rod insulated electrically from the wall 1 in the passage therethrough at all times.

The construction shown in FIG. 2 overcomes the objections to the construction shown in FIG. 1 and not only eliminates dangers of electrical shorts and direct contact between the rod and wall, but is mechanically simpler and easier to make. In the embodiment of the improved construction shown in FIG. 2, the metal wall 6 separates two areas under different fluid pressure differentials, and may, for example, define a closed chamber in which the fluid pressure may be above or below that outside of the chamber. For example, the pressure within the chamber or at one face of the wall 6 may be a partial vacuum. This wall 6 has a cylindrical passage 7 therethrough from face to face, and a cylindrical rod 8 passes somewhat loosely through the wall 6 in this passage 7, with a small clearance "c" which is to be kept to a very small minimum.

The wall 6 has a rabbet or groove 9 formed in an outer end of the passage 7, such as the end outside of the closed chamber. This rabbet 9 faces outwardly through the nearest end of the passage and is in effect an enlargement of the diameter of the passage 7 at the one end of the passage, extending from the open end of the passage inwardly for only a short distance sufficient to receive and hold tightly therein an O-ring 10. This ring 10 is of elastic, electrically insulating material such as one which has the elastic properties of rubber. One such material is commonly made of elastic rubber or rubber substitutes, such as of natural rubber or a rubber substitute known in the trade as neoprene.

The O-ring 10 is under substantial pressure radially of itself so as to be compressed between the periphery of the groove or rabbet 9 and the periphery of the rod 8, without compression of the ring in directions normal to its faces. The sealing action of the ring 10 with the rabbet and the rod is effective at two surfaces only, which are the inner and outer peripheries of the ring, that is, at the inner and outer diameters of the ring. Contact on the sides of the O-ring is not essential to obtain a very satisfactory seal.

The rabbet is closed by a plate, washer, or member 11 of fairly rigid, electrically insulating material which has an aperture that approximately fits the rod periphery. This plate is fitted on the rod as shown in FIG. 2, and secured against that face of the wall 6 nearest the rabbet. It is detachably secured to wall 6 in any suitable manner such as by headed screws 12 whose shanks pass through small apertures in the plate and are threaded into but not through the wall 6. The plate 11 overlies the end opening to the rabbet and protects the O-ring and prevents its removal from the rabbet. Its aperture which receives the rod 8 has a rotary or sliding bearing on the rod, with very minute clearance.

The plate 11 thus holds the rod 8 against material lateral displacement or movement in the passage 7, and prevents danger of direct contact of the rod with the wall. Hence the clearance "c" in FIG. 2 can be made very small as recommended by the makers of the O-rings, without danger of the rod in use making direct contact with the metal wall. While O-rings are the preferred and most commonly employed sealing rings, the rings can be made of other shapes in cross section depending upon the conditions of use.

The washer or plate 11 guides the metal rod and insulates it from the metal wall, and may be made of any suitable electrically insulating material. It preferably is made of polytetrafluoroethylene, one such material being widely sold in the trade under the trademark "Teflon." This particular material, polytetrafluoroethylene, is very desirable because it gives a firm support for the rod but has a very low coefficient of sliding and rotary friction.

It will be understood that various changes in the details, materials, and arrangements of parts, which have been herein described and illustrated in order to explain the nature of the invention, may be made by those skilled in the art within the principle and scope of the invention as expressed in the appended claims.

I claim:

1. An electrically insulated seal between a metallic rod and a metallic chamber wall where a fluid pressure differential exists at opposite faces of said wall, and said rod passes through and moves in said wall, which comprises said wall having a passage therethrough from face to face, said rod being movable in said passage and passing through said wall with a close clearance, said wall at one end of said passage having therein an endless rabbet that faces outwardly of and opens into the passage, an endless, apertured element of resilient, electrically insulating material disposed in said rabbet, encircling said rod, tightly engaging the rod periphery and the peripheral wall of said rabbet while free of pressure therein in a face to face direction, fully spacing said rod from direct contact with said passage periphery, and sealing the passage against movement of fluid through it along said rod, and electrically insulating means secured to said wall and, extending over said rabbet, for confining said element in said rabbet, and limiting transverse movement of the shaft to prevent direct contact of said rod with said wall.

2. The seal approximately as set forth in claim 1, wherein said rabbet is formed in that end of said passage nearest the exterior of the chamber formed by said wall, and said insulating means is confined to the exterior face of said wall.

3. The seal approximately as set forth in claim 1, wherein said passage and said rod are cylindrical, said element is an O-ring having the properties of elastic rubber and said insulating means is of polytetrafluoroethylene.

4. The seal as set forth in claim 1, wherein said insulating means is rigid, encircles said rod, and fully spaces said rod from movement laterally of its length into direct contact with the periphery of the passage.

5. An electrically insulated seal between a metallic rod and a chamber wall where a fluid pressure differential exists on opposite sides of said wall, comprising said wall having a metallic portion with a passage therethrough from face to face, said metallic rod passing along and through said passage and movable in said wall and having a small clearance with the periphery of said passage, said wall at and in one end of said passage having an outwardly opening rabbet therein, an O-ring of resilient, electrically insulating material disposed in said rabbet, having its entire outer periphery seated firmly against the periphery of said rabbet and its entire inner periphery encircling and seated firmly about the periphery of said rod, and fully spacing said rod from the wall of said passage, and rigid electrically insulating means secured against that face of said wall where the passage has the rabbet and overhanging the adjacent end of said passage, covering the open end of said rabbet adequately to confine said O-ring therein, and having an aperture through and in which said rod extends and can move with close clearance, for preventing transverse movement of said rod far enough to engage directly with said wall through which it passes.

6. An electrically insulated seal for a chamber where a movable rod enters, and where fluid pressure differentials exist within and without the chamber, which comprises said rod, an enclosing wall of said chamber in which chamber a partial vacuum condition may exist, said wall having a cylindrical shape and formed of electrically conpassage therethrough from face to face, said movable rod having a cylindrical shape and formed of electrically conducting material passing through and movable in said wall in said passage with a small clearance between the rod periphery and the wall of the passage, one end of said passage being enlarged in diameter for a short distance to form an outwardly facing rabbet, a tight fitting ring of resilient, electrically insulating material fitted on and in continuous contact with the periphery of said rod, disposed in said rabbet, tightly fitting the entire peripheral wall of said rabbet, and spacing the entire periphery of said rod from direct contact with said passage wall, and means formed of electrically insulating material secured to said wall and closing said rabbet, for confining said ring therein, guiding and fully spacing said rod from said wall of said passage, and preventing transverse movement of said rod far enough to engage with said wall through which it passes.

7. The seal as set forth in claim 6, wherein said ring is an O-ring of neoprene rubber and the portion of said ring confining means of insulating material that extends around and in contact with said rod is of polytetrafluoroethylene and closely surrounds said rod.

8. An electrically insulated seal between a metallic rod and a metallic chamber wall where a fluid pressure differential exists at opposite faces of said wall, and said rod passes through and moves in said wall, which comprises said wall having a passage therethrough from face to face, said rod being smaller than and movable in said passage and passing through said wall with a close clearance and free of contact with the surface of said passage, said wall at one end of said passage having therein an endless rabbet that faces outwardly of and opens into the passage, an endless, apertured element of resilient, electrically insulating material disposed in said rabbet, encircling said rod, tightly engaging the rod periphery and the peripheral wall of said rabbet, fully spacing said rod from direct contact with said passage periphery, and sealing the passage against movement of fluid through it along said rod, and electrically insulating means secured to said wall and extending over said rabbet, for confining said element in said rabbet and limiting transverse movement of said rod to prevent direct contact of said rod with said wall.

References Cited in the file of this patent

UNITED STATES PATENTS

| 2,130,741 | McClain | Sept. 20, 1938 |
| 2,383,018 | Shere | Aug. 21, 1945 |
| 2,422,379 | Westman | June 17, 1947 |
| 2,615,763 | Wolford | Oct. 28, 1952 |
| 2,656,403 | Sealey | Oct. 20, 1953 |
| 2,864,883 | Townsend | Dec. 16, 1958 |
| 2,918,521 | Abrams | Dec. 22, 1959 |

FOREIGN PATENTS

| 1,013,891 | France | Aug. 5, 1952 |
| 1,143,975 | France | Apr. 15, 1957 |